United States Patent
Holland et al.

(10) Patent No.: US 12,549,464 B2
(45) Date of Patent: *Feb. 10, 2026

(54) EVENT DETECTION BASED ON UPLINK TRAFFIC IN A TELECOMMUNICATIONS NETWORK

(71) Applicant: T-Mobile USA, Inc., Bellevue, WA (US)

(72) Inventors: Mark Holland, Vienna, VA (US); Jeffrey Michael Torgerson, Bellevue, WA (US); Robert Zaruba, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 517 days.

This patent is subject to a terminal disclaimer.

(21) Appl. No.: 18/148,760

(22) Filed: Dec. 30, 2022

(65) Prior Publication Data

US 2024/0223486 A1 Jul. 4, 2024

(51) Int. Cl.
*H04L 43/0882* (2022.01)
*H04W 4/021* (2018.01)
*H04W 24/08* (2009.01)

(52) U.S. Cl.
CPC ......... *H04L 43/0882* (2013.01); *H04W 4/021* (2013.01); *H04W 24/08* (2013.01)

(58) Field of Classification Search
CPC ... H04W 72/21; H04W 72/569; H04W 4/029; H04W 4/021
See application file for complete search history.

(56) References Cited

U.S. PATENT DOCUMENTS

| | | | |
|---|---|---|---|
| 8,065,073 B2 | 11/2011 | Downs et al. | |
| 8,079,083 B1 | 12/2011 | Bennett et al. | |
| 8,396,467 B2 | 3/2013 | Bonnefoy et al. | |
| 8,700,296 B2 | 4/2014 | Chapman et al. | |
| 8,964,582 B2 | 2/2015 | Wilkinson | |
| 9,094,929 B2 | 7/2015 | Fix et al. | |
| 9,240,934 B2 | 1/2016 | Bishop et al. | |
| 9,760,237 B2 | 9/2017 | Eraker et al. | |
| 9,848,313 B1 * | 12/2017 | Cottle | G06F 40/30 |

(Continued)

FOREIGN PATENT DOCUMENTS

| | | |
|---|---|---|
| CN | 107431898 B | 6/2020 |
| DE | 102018004028 A1 | 12/2018 |

(Continued)

*Primary Examiner* — Mong-Thuy T Tran
(74) *Attorney, Agent, or Firm* — Perkins Coie LLP

(57) ABSTRACT

An event detection system in a telecommunications network is coupled to base stations to receive characteristics of uplink network traffic transmitted to the base stations. The event detection system identifies a geographic area in which the one or more characteristics of a subset of the uplink network traffic, generated by electronic devices located within the identified geographic area, satisfy a criterion. An event indicator is generated based on the subset of uplink network traffic. The event indicator can then be used by the event detection system, another component of the telecommunications network, or an external system to provide an event-based service that leverages information about events to provide information or content to people participating in or nearby to an event.

18 Claims, 7 Drawing Sheets

(56) References Cited

U.S. PATENT DOCUMENTS

| | | | |
|---|---|---|---|
| 10,061,805 B2 | 8/2018 | Tidwell et al. | |
| 10,193,899 B1 | 1/2019 | Shavell et al. | |
| 10,318,973 B2 | 6/2019 | Milton et al. | |
| 10,353,078 B2 | 7/2019 | Meredith et al. | |
| 10,477,416 B2 | 11/2019 | Bhorkar et al. | |
| 10,531,241 B2 * | 1/2020 | Quitoriano | H04L 67/52 |
| 10,540,483 B2 | 1/2020 | Hardee et al. | |
| 10,631,198 B2 | 4/2020 | Zhang | |
| 10,735,891 B1 | 8/2020 | Trim et al. | |
| 10,771,827 B2 * | 9/2020 | Van Doorn | H04N 21/6582 |
| 10,810,620 B2 | 10/2020 | Malik | |
| 11,197,145 B2 * | 12/2021 | Martin | H04M 3/5116 |
| 11,223,566 B2 | 1/2022 | Serrano Garcia et al. | |
| 11,647,374 B2 | 5/2023 | Malboubi et al. | |
| 11,706,313 B2 | 7/2023 | Richards | |
| 11,755,551 B2 * | 9/2023 | Barthel | G06F 16/957 707/738 |
| 11,790,401 B2 * | 10/2023 | Pittman | G06Q 30/0264 705/14.43 |
| 11,831,491 B2 | 11/2023 | Siddiqi et al. | |
| 12,063,581 B2 * | 8/2024 | Martin | H04M 3/5141 |
| 2015/0317809 A1 * | 11/2015 | Chellappan | H04W 4/90 455/404.1 |
| 2016/0203143 A1 * | 7/2016 | Kritt | G06F 16/338 707/722 |
| 2016/0219402 A1 * | 7/2016 | Zimerman | H04W 4/60 |
| 2016/0226950 A1 * | 8/2016 | Goel | H04L 67/1097 |
| 2017/0191843 A1 * | 7/2017 | Yadav | H04W 4/02 |
| 2017/0230786 A1 * | 8/2017 | Ramamurthy | H04W 4/024 |
| 2017/0251347 A1 * | 8/2017 | Mehta | H04W 4/08 |
| 2019/0082312 A1 * | 3/2019 | Neybert | H04W 4/02 |
| 2022/0292543 A1 | 9/2022 | Henderson | |
| 2022/0337977 A1 * | 10/2022 | Bolon | H04W 24/08 |
| 2022/0338029 A1 | 10/2022 | Bizzarri et al. | |
| 2023/0284337 A1 | 9/2023 | Obaidi | |
| 2023/0306847 A1 | 9/2023 | Solazzo et al. | |
| 2024/0127542 A1 * | 4/2024 | Soryal | H04W 4/90 |

FOREIGN PATENT DOCUMENTS

| | | |
|---|---|---|
| EP | 3084712 A1 | 10/2016 |
| EP | 3695629 A1 | 8/2020 |
| EP | 3435706 B1 | 12/2023 |
| EP | 3617651 B1 | 1/2024 |
| EP | 3782381 B1 | 3/2024 |
| KR | 102328015 B1 | 11/2021 |
| WO | 2021186221 A1 | 9/2021 |
| WO | 2021216616 A1 | 10/2021 |
| WO | 2021239521 A1 | 12/2021 |

* cited by examiner

EVENT DETECTION BASED ON UPLINK TRAFFIC IN A TELECOMMUNICATIONS NETWORK

CROSS-REFERENCE TO RELATED APPLICATION

This application is related to U.S. patent application Ser. No. 18/148,814, filed on Dec. 30, 2022, and entitled "EVENT-BASED DATA AGGREGATION FOR EMERGENCY RESPONSE", which is incorporated herein by reference in its entirety.

BACKGROUND

Many different online platforms now exist for creating, sharing, or storing media content. At the same time, there has been a proliferation of the number and types of portable electronic devices that can capture and share media content using the online platforms. Accordingly, real-time or substantially real-time sharing of media content has become ubiquitous.

BRIEF DESCRIPTION OF THE DRAWINGS

Detailed descriptions of implementations of the present invention will be described and explained through the use of the accompanying drawings.

Figure 1:
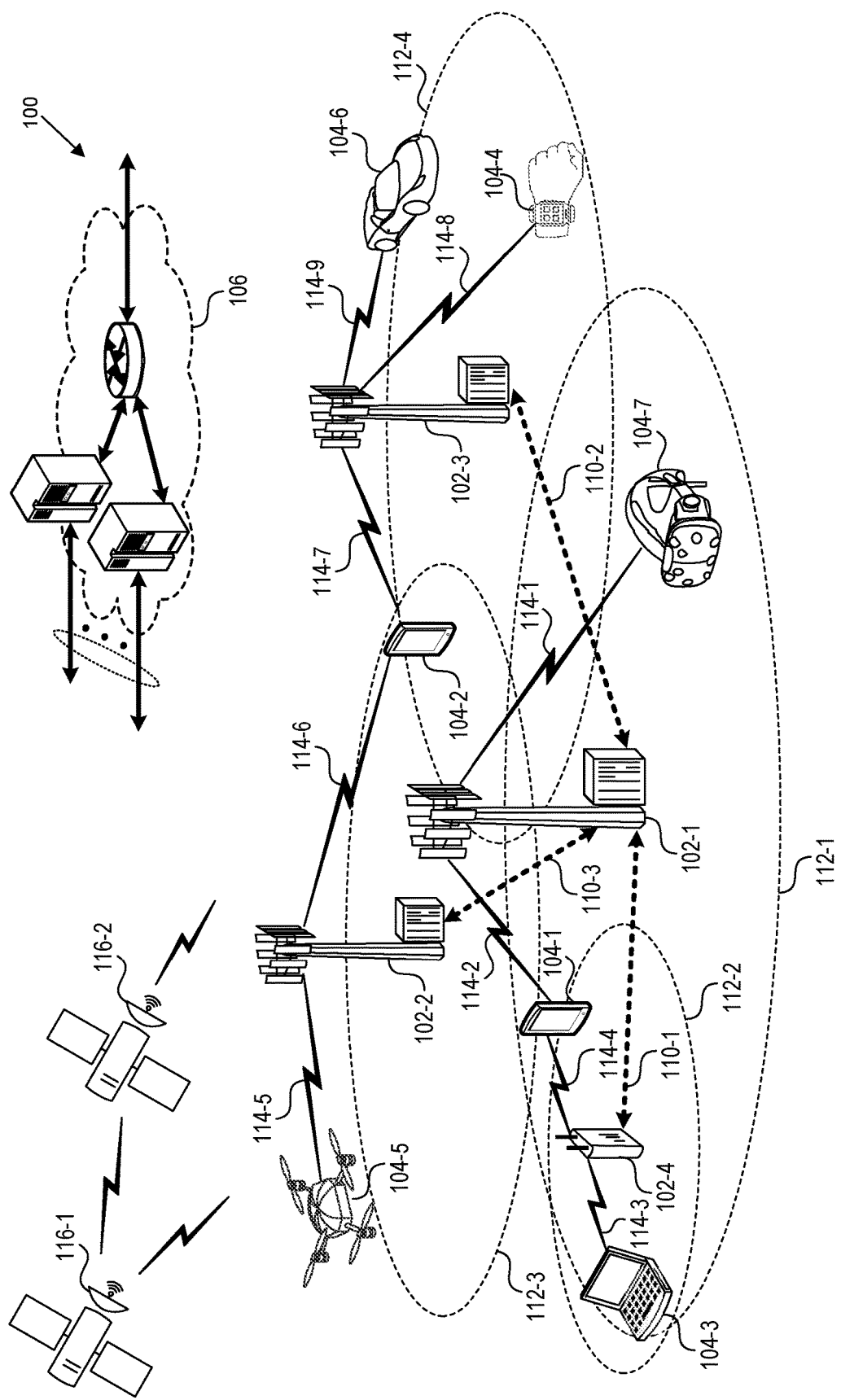
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Many different types of events occur in which people gather in the same area to observe or participate in the same matter. These events, which include, for example, protests, parades, sporting events, concerts, festivals, holiday celebrations, or traffic accidents, can range from structured events that are planned in advance at a certain time and location to spontaneous gatherings. Whether an event is a structured proceeding occurring in a constrained venue or a spontaneous convergence of a crowd, there may be unique services that are useful to, or that may enhance the experience of, attendees of the event, first responders, or anyone who needs to travel past an area occupied by a crowd of event attendees. Thus, the inventors have conceived of and reduced to practice a system and method for automatically detecting events, which leverages uplink network traffic detected in a telecommunications system to automatically detect a wide variety of events of different types, sizes, or locations.

In some implementations, an event detection system in a telecommunications network receives one or more characteristics of uplink network traffic transmitted to base stations in the telecommunications network by electronic devices. The event detection system identifies a geographic area in which the one or more characteristics of a subset of the uplink network traffic, generated by electronic devices located within the identified geographic area, satisfy a criterion. An event indicator is generated based on the subset of uplink network traffic. The event indicator can then be used by the event detection system, another component of the telecommunications network, or an external system to provide an event-based service that leverages information about events to provide information or content to people participating in or nearby to an event. For example, one or more of these systems can generate an interactive map of the geographic area of an event, in which identifiers of media content items are displayed relative to the location within the geographic area where the media content item was generated in order to enable users to experience the event from different angles or to experience different aspects of the event. The systems can further provide event-based services such as event-specific content feeds, optimization of the telecommunications network to support events, or customized event information for emergency responders.

In an example use of the event indicators generated by the event detection system, a service links media content items to an event in a manner that enables an emergency responder to access the content items to obtain information about the event. In some implementations, the service identifies one or more media content items that were generated by respective electronic device associated with an event (e.g., located within the geographic area identified by the event indicator, during a time that the event is expected to be ongoing). Each of the media content items can be mapped to a respective location within the identified geographic area. A first media content item can then be output to an emergency response system based on the location to which the media content item is mapped. For example, the service outputs a media content item that is closest to the direction from which an emergency responder is approaching an event, a media content item that is linked to a "hotspot" of activity within the event, or a media content item selected by the emergency responder.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the system 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provides data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service requirements and multi-terabits per second data transmission in the 6G and beyond era, such as terabit-per-second backhaul systems, ultrahigh-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low User Plane latency. In yet another example of 6G, the network 100 can implement a converged Wi-Fi and Core architecture to increase and improve indoor coverage.

5G Core Network Functions

Figure 2:
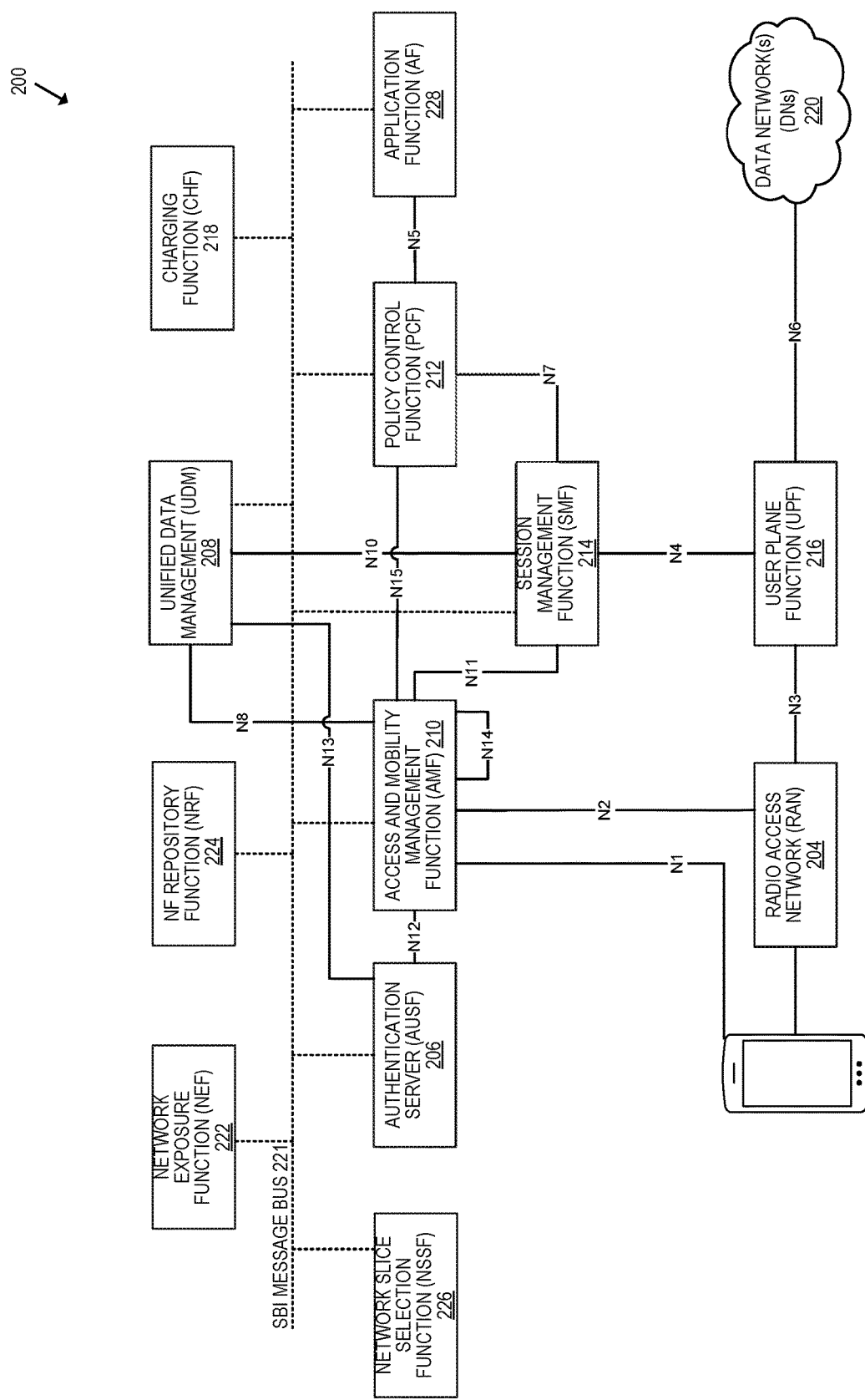
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, a NF Repository Function (NRF) 224 a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules to the control plane functions so that they can enforce them. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make-up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224, use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical QoS and charging rules, includes Network Slice selection, which is regulated by the NSSF 226.

Event Detection in a Telecommunications Network

Figure 3:
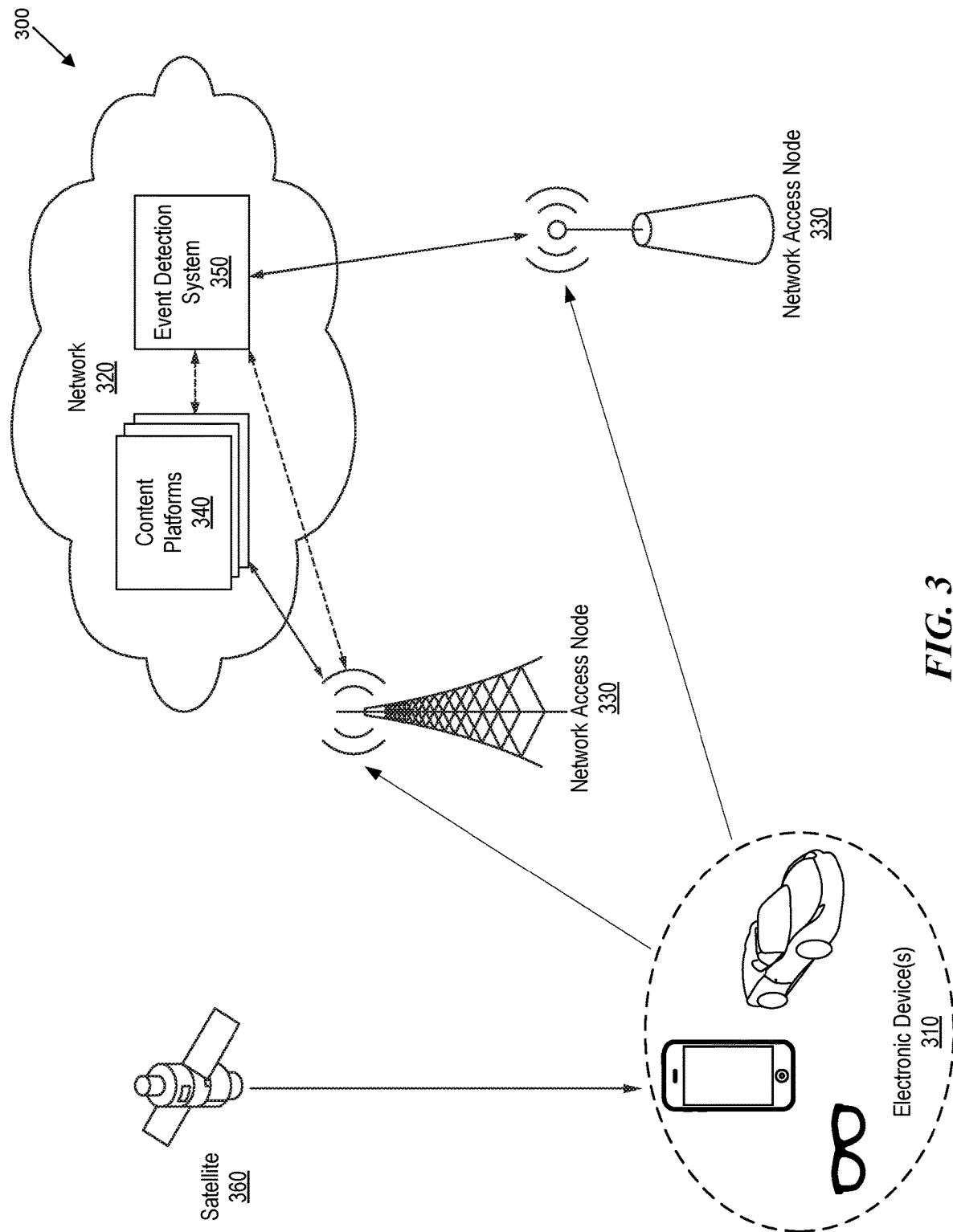
FIG. 3 illustrates a system environment in which user devices operate, according to some implementations.

FIG. 3 illustrates a system environment 300 in which electronic devices operate. As shown in FIG. 3, user electronic devices 310 communicate over a telecommunications network 320 via one or more network access nodes (NANs) 330.

One or more content platforms 340 store or host media content produced by end users and/or distribute media content to other users. The content platforms 340 can include, for example, video livestreaming platforms, social media platforms, web conferencing tools, or cloud storage systems. Users of the platforms 340 use electronic devices 310 to capture media content such as videos, audio recordings, and/or photographs. The electronic devices 310 transmit the captured media content to the content platforms 340 for storage or distribution. Any of a variety of types of electronic devices 310 can capture media content that is transmitted to the content platforms 340, including, for example, any of the wireless devices 104 described with respect to FIG. 1. Media content may be transmitted substantially in real-time during or after its capture, such as if the media content is captured as part of a live stream or if the content is automatically stored to a cloud storage platform. Alternatively, users of the electronic devices 310 may cause media content to be transmitted at some time after its capture, as for example the users upload the content to social media, email the content to another person, or save the content to a cloud storage platform. In some cases, as part of capturing media content, the electronic devices 340 record information related to a location of the device at the time the content was captured. For example, the electronic devices 340 each record global positioning information received from a global positioning sensor in the device, altitude of the device, an identifier of any data networks available to the electronic device, or signal strength associated with the data networks.

An event detection system 350 monitors levels of uplink traffic in the telecommunications network 320 to detect events in which a group of people are located in approximately the same geographic area and observing or participating in the same matter. In general, telecommunications networks are biased based on the assumption that a significant percentage of traffic on the network is downlink traffic, with only a small portion being uplink traffic. However, people who are observing or participating in an event may be likely to capture content to share or remember the event, which produces uplink traffic on the network(s) on which the people's electronic devices are registered to communicate. For example, users may livestream video of an event or may capture video recordings, audio recordings, or photographs as the event occurs. The event detection system 350 is communicatively coupled to a plurality of network access nodes, such as terrestrial NANs 330 (e.g., eNBs or gNBs) and/or non-terrestrial network nodes (e.g., a satellite 360, high altitude platforms (HAPs), or unmanned aerial system (UAS) nodes). From these network access nodes, the event detection system 350 receives characteristics of uplink traffic measured by the NANs. In some implementations, the event detection system 350 is affiliated with the telecommunications network in which the NANs operate. For example, the event detection system 350 is implemented within the core network of the telecommunications network or is communicatively coupled to devices in the core network to receive information about uplink network traffic. The event detection system 350 determines an event is occurring within a given geographic area when the uplink traffic from the area satisfies one or more criteria.

The event detection system 350 can detect any of a variety of types of events in which event attendees generate uplink network traffic. Example events detected by the event detection system 350 include protests, parades, sporting events, concerts, festivals, holiday celebrations, or traffic accidents. In implementations in which the event detection system 350 receives characteristics of uplink network traffic from network access nodes in a telecommunications network, the event detection system 350 detects events regardless of the content platform 340 to which the uplink network traffic is routed. Once events have been detected, the event detection system 350 generates data structures that can be used by systems within the telecommunications network, the content platforms 340, or other systems to provide services associated with events.

Events can be detected by the event detection system 350 substantially in real-time, as the event is occurring. Additionally or alternatively, the event detection system 350 retroactively determines that an event occurred based on an analysis of uplink traffic characteristics over a period of time.

Although implementations are described herein with respect to detecting events and creating event data structures using levels of uplink traffic in a telecommunications network (e.g., as measured at network access nodes), other types of communication traffic can be used in similar ways. In general, the event detection system 350 can process levels of any types of communication data, including data transmitted in accordance with protocols such as long-term evolution/long-term evolution-advanced (LTE/LTE-A), new radio (NR), IEEE 802.11, Bluetooth, low-energy Bluetooth (BLE), ultra wideband (UWB), radio-frequency identification (RFID), or ZigBee. Any of these types of communications can be used on its own or in combination with other communication types to detect events. For example, IEEE 802.11-based communications can be used to detect events occurring inside a building when cellular communication signals are weak. Similarly, while cellular communications can be used to detect events occurring across larger geographic areas, shorter range technologies such as BLE can be used to detect information about events occurring in smaller areas.

Figure 4:
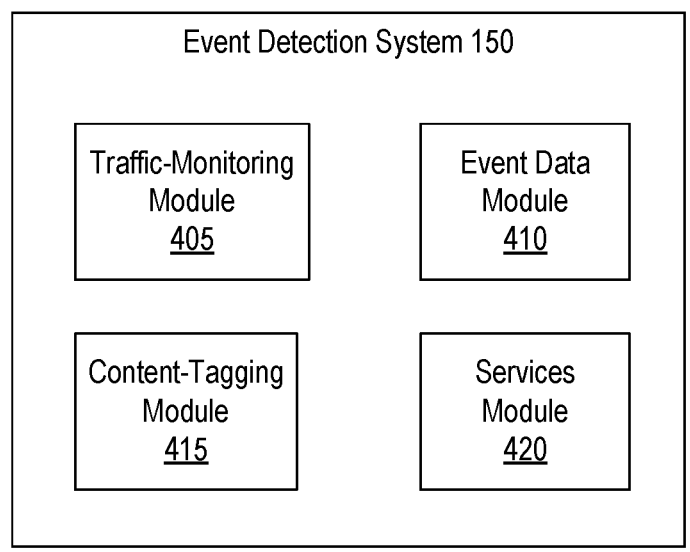
FIG. 4 is a block diagram illustrating functional modules executed by an event detection system, according to some implementations.

FIG. 4 is a block diagram illustrating functional modules executed by the event detection system 350, according to some implementations. As shown in FIG. 4, the event detection system 350 includes a traffic-monitoring module 405, an event data module 410, a content-tagging module 415, and a services module 420. Other implementations of the event detection system 350 include additional, fewer, or different modules, or distribute functionality differently between the modules. As used herein, the term "module" refers broadly to software components, firmware components, and/or hardware components. Accordingly, the modules 405, 410, 415, 420 could each be comprised of software, firmware, and/or hardware components implemented in, or accessible to, the event detection system 350.

The traffic-monitoring module 405 monitors characteristics of uplink traffic on a data communications network to detect when the uplink traffic satisfies a criterion for generating an event indicator. The criteria applied by the traffic-monitoring module 405 include, for example, thresholds related to volume of uplink network traffic (measured, e.g., as a raw data volume or as a ratio to downlink traffic), spatial density of uplink network traffic (e.g., volume of uplink traffic generated within a specified spatial area), rate of increase of uplink traffic, or combinations thereof. For example, the traffic-monitoring module 405 determines an event has been detected when a volume of uplink traffic generated within a specified window of time is greater than a threshold.

Different types of events may garner different uplink traffic characteristics, and thus some implementations of the traffic-monitoring module 405 apply different criteria to detect different types of events. The type of criterion applied by the traffic-monitoring module 405 can therefore be designed to detect a particular type of event. Alternatively, the traffic-monitoring module 405 can predict the type of event based on the criterion that has been satisfied by uplink traffic characteristics. In an example, uplink traffic may rise suddenly at the beginning of a concert as many concert attendees start capturing media content within a relatively short window of time, within a relatively defined geographic area (e.g., the area corresponding to a concert venue). Thus, the traffic-monitoring module 405 can apply a criterion that detects a concert is likely to be happening if a rate of increase of uplink traffic within a given geographic area exceeds a specified threshold. On the other hand, attendees of a protest or festival may capture media content over a more extended period of time, and potentially over a more dynamic geographic area. A criterion for detecting a protest, accordingly, may require a total volume of uplink traffic to be greater than a specified threshold for a specified amount of time, or an average volume of uplink traffic within a specified time to be greater than a specified threshold.

Similarly, network traffic in different geographic areas may have different characteristics, such that the traffic-monitoring module 405 applies different criteria to uplink traffic detected in different geographic areas in order to more accurately detect events in the different areas. In particular, some areas may have higher average or baseline levels of uplink traffic than other areas, while some areas may have greater variation in levels of uplink traffic than other areas. For example, the geographic area surrounding a popular landmark may have a high ratio of uplink to downlink traffic as it is common for visitors to capture livestream videos at the landmark. In contrast, there may be little network traffic (either uplink or downlink) to electronic devices inside a stadium unless an event is occurring in the stadium.

Furthermore, the traffic-monitoring module 405 can apply criteria that account for the types of electronic device 310 from which the uplink traffic originated. For example, uplink traffic originating from a vehicle's dashcam is network traffic that is likely to be originating from a geographic area that has a low density of electronic devices (a road). Accordingly, the traffic-monitoring module 405 can apply a criterion that uses a lower threshold for detecting an event based on dashcam-originating uplink traffic than the threshold that is applied to detect events based on uplink traffic originating from other types of devices.

Some implementations of the traffic-monitoring module 405 receive affirmative tags applied to content items associated with the uplink network traffic. In these implementations, another type of criteria that can be applied by the traffic-monitoring module 405 uses the content tags to detect events. For example, the traffic-monitoring module 405 determines an event is occurring when it detects a threshold number of the same content tag within a certain period of time and originating from within a given geographic area.

Some types of criteria can use dynamic thresholds that vary over time. For example, different thresholds can be applied on different days of the week or different times of day. In some implementations, the traffic-monitoring module 405 uses historical measurements of uplink network traffic characteristics to set the thresholds. For example, a threshold is set as a percentage of a moving average volume of uplink traffic.

In some implementations, the criteria applied by the traffic-monitoring module 405 are defined by a service that uses the event data generated by the event detection system 350. For example, one of the content platforms 340 uses event data to provide an event-based service to its users. The content platform 340 can accordingly define the criteria that are used by the event detection system 350 to detect the events output to the platform.

In some implementations, the traffic-monitoring module 405 applies machine learning-based techniques to detect events. For example, the traffic-monitoring module 405 inputs characteristics of uplink network traffic to a trained decision tree, random forest, or neural network that is configured to predict whether an event is occurring based on the uplink traffic characteristics. Different models can be trained to identify different types of events or events occurring at different locations.

The traffic-monitoring module 405 can further apply a criterion to determine when an event has ended. Like the criteria for detecting an event has begun, a criterion for detecting an event has ended can include an evaluation of any of a variety of characteristics of uplink network traffic, and can be tuned to detect event ending times for different types of events, ending times for events at different locations, ending times for events detected based on network traffic from different types of devices, etc. The traffic-monitoring module 405 can further evaluate other types of inputs to detect the ends of events, in addition to or instead of using uplink network traffic data to detect when an event has ended. For example, the traffic-monitoring module 405 can detect movement of the electronic devices that generated uplink traffic (e.g., based on the base stations to which the electronic devices connect), determining that an event has ended when a specified percentage of the devices move out of the area of the event. Furthermore, for some types of events, some implementations of the traffic-monitoring module 405 receive information that identifies the ending time of the event. For example, for events such as concerts or sporting events that occur in a venue with a public calendar, the traffic-monitoring module 405 looks up the ending time for an event occurring at the venue from the venue's calendar.

The event data module 410 generates event indicators to represent events detected by the traffic-monitoring module 405. An event indicator can be a data item or data structure that represents information associated with a detected event. The event indicator can be output to another system, internal or external to the telecommunications network, to enable the system to leverage event-based data for services.

The event indicator includes an identifier of a geographic location of the event. The event data module 410 determines the geographic location based on characteristics of the uplink network traffic and the locations of electronic devices associated with the uplink traffic. To determine the electronic device locations, some implementations of the event data module 410 extract geolocation information from header fields in data transmissions associated with the electronic devices. Base stations can also triangulate the positions of the electronic devices that are communicatively coupled to each base station, or a global positioning satellite 360 can measure the position of an electronic device. Additionally or alternatively, the event data module 410 defines the geographic area of an event based on the location of any base stations handling the uplink traffic that is used to detect the event, without identifying the location of any individual electronic devices.

When defining the geographic location of an event for an event indicator, some implementations of the event data module 410 identify boundaries of the geographic area. For example, the event data module 410 selects latitudinal and longitudinal coordinates for a boundary, such that a specified quantity of the uplink network traffic (e.g., at least 95%) originated inside the boundary defined by the coordinates. Similarly, the event data module 410 can select geographic features to define the boundary of an event, using, for example, roads, rivers, or railroad tracks to identify event boundaries. The radius of discovery for a particular event can vary depending on population density or device density within a given geographic area. For example, in an area with high population or device density, multiple events may be occurring when uplink traffic thresholds are satisfied at the NANs covering the dense area. On the other hand, when an uplink traffic threshold is satisfied at a NAN in a sparsely populated area, it is more likely that the traffic corresponds to the same event. Thus, the event data module 410 can identify an event's geographic boundaries based on any uplink traffic around the NAN in the sparsely populated area, while subdividing the densely populated geographic area into smaller event boundaries.

In other implementations, the event detection system 350 determines that an event is occurring inside a venue when at least a threshold amount of the uplink network traffic that satisfied an event detection criterion originated from within the venue. Thus, when an event is detected inside a venue such as a stadium, theater, convention center, campus, plaza, or park, the event detection system 350 can save an identifier of the venue as an identifier of the geographic area in which the event is occurring.

At times, different events may occur in proximity to one another. To distinguish concurrent events, some implementations of the event data module 410 use location information gleaned from multiple types of communication protocols. For example, in an event that includes multiple sub-events, such as a festival with multiple concert stages, beacons positioned at specified locations within the event's geographic area (e.g., at each concert stage) can be used to detect electronic devices within different subregions of the geographic area. The beacons can emit, for example, WiFi, BLE, or UWB signals detectable by the electronic devices, enabling the electronic devices to link content items to particular subregions within an event and thus to different sub-events. Other implementations of the event data module 410 access event tags associated with content items to distinguish between different events. For example, the event data module 410 defines the geographic boundary of Event A as being a boundary around an area from which at least a threshold percentage of content items with an "#EventA" tag originate. Likewise, the geographic boundary of Event B is defined as being a boundary around an area from which at least a threshold percentage of content items with an "#EventB" tag originate. The boundary of Event B may overlap with the boundary of Event A.

The event indicator can also identify a predicted type of the event, in some implementations. As described above, the event data module 410 can apply different criteria to detect different types of events. Similarly, some implementations of the event data module 410 predict the type of event that is occurring based on which criterion is satisfied by the uplink traffic characteristics. Alternatively, the event data module 410 can predict the type of event using other techniques. For example, the event data module 410 applies a trained classifier that is configured to output a classification of an event based on inputs such as uplink traffic characteristics, properties of the electronic devices generating the uplink traffic, properties of the location where the event is occurring, etc. In another example, the event data module 410 receives information about the type of event from users or from an external data repository (e.g., a calendar of events at a given location).

The event indicator can further identify starting and/or ending times of an event, as predicted by the traffic-monitoring module 405. Thus, the event indicator can define a time box for the corresponding event.

The content-tagging module 415 generates tags that enable content items to be linked to an event. In general, once the event detection system has determined that an event exists, the content-tagging module 415 selects a user-readable or computer-readable identifier that can be added to content generated as part of the event in order to link the content to the event indicator. For example, a tag can be a short description related to an event, such as "#Downtown-Protest" or "#EltonJohnLive," that is readable by users who may attach such tags to their content items as well as by users who consume the content items. Alternatively, a tag can be an alphanumeric code, such as a unique event identifier, that is used by a computer system to link content to an event but that may not be presented to or meaningful to human users. In some implementations, the content-tagging module 415 outputs tags to external systems (e.g., via an application programming interface (API) to enable the external systems to attach tags to their content items. For example, a livestreaming video platform receives tags for events generated by the event detection system. The livestreaming video platform in turn makes the tags available to its users so that, for example, a user who is streaming a video through the livestreaming platform can tag the video as being linked to a particular event. In other implementations, the content-tagging module 415 links the tags to content items. For example, the event detection system automatically applies an event tag to any uplink network traffic originating from within the geographic boundary of the corresponding event.

In some implementations, the content-tagging module 415 generates a recommended tag by predicting an identity of the event. An event's identity can be predicted in some cases using the location of the event. For some types of events, for example, the event detection system determines an event is occurring within a particular venue. The content-tagging module 415 looks up a calendar of events scheduled for the venue to identify an event that is scheduled to occur at the venue during the time the event detection system detects an event. For example, the content-tagging module 415 identifies a particular sporting match that is scheduled to occur in a stadium and generates a tag describing the match. In other cases, the content-tagging module 415 predicts an identity of an event based on a date or time of the event. For example, an event that occurs on a holiday may be predicted to be an event to celebrate that holiday.

For other types of events, the content-tagging module 415 generates tags by predicting an identity of an event currently occurring at a location based on previous events at that location. For example, if a given plaza in a city is often used for protests, an event occurring in the plaza can be predicted to also be a protest. In another example, if an event is detected to be occurring on a Saturday in a soccer field that is typically used for youth soccer games on Saturdays, the event is likewise predicted to be a youth soccer game.

In some implementations, the content-tagging module 415 generates tags based on user history. For example, the content-tagging module 415 determines a particular user often livestreams their child's soccer game on Saturday morning. Thus, if an event is detected on Saturday morning at the soccer field and the user is determined to be one of the users whose uplink network traffic contributed to the event detection, the content-tagging module 415 suggests tagging the livestream video with a tag corresponding to a youth soccer game.

Some implementations of the content-tagging module 415 generate a recommended tag by prompting a set of users for a description of the event. When a user captures content within the geographic zone of an event detected by the event detection system, the content-tagging module 415 can send the user a prompt to input a description of the event. User inputs can be received as freeform descriptions, in which case the content-tagging module 415 uses natural language processing techniques (such as lemmatization, stemming, or semantic analysis) to derive a topic from the set of received user descriptions. User inputs can additionally or alternatively be received as selections from among a few predefined event description options. For example, the content-tagging module 415 can generate a set of potential event descriptions based on predictions of the likely identity of the event or based on previously received user inputs.

The services module 420 administers or enables one or more services based on the event data generated by the event data module 410. The services provided by the services module 420 can include services that are accessible by users (e.g., via an application) or services that are accessible by other enterprises (e.g., via an API that enables another enterprise to build its own user-facing application based on the event indicators).

One example event-based service is an interactive map of an event, where media content items can be linked to the event and tied to corresponding locations on the map from which the content items were captured. When the event is a protest, for example, the interactive map can be accessed by attendees of the protest or emergency responders to view video captured from different areas within the protest, enabling users of the map to gain information about what is happening at other locations or to view the protest from different angles. Another example service is a feed of content items, filtered to include only content items linked to a particular event. For example, a social media page for a music artist can include a feed of content items captured at the artist's concert. Still another example service automatically stores media content items captured as part of an event to enable later analysis of the event, reminiscing about the event, or sharing of the stored media content.

In some implementations, the services module 420 selectively outputs event indicators to particular internal or external systems, based on features of the event such as size of the event, location of the event, or type of the event. For example, a particular social media platform contracts with the event detection system 350 to receive event indicators associated with any event with greater than a certain number of attendees.

In some implementations, the services module 420 enforces privacy policies related to event data or media content associated with an event. Alternatively, privacy is enforced by an external system (such as a content platform 340) that builds a service using the event indicators generated by the event detection system 350. For example, a content platform 340 generates event-based services related to specified groups of users (e.g., users registered to specified private groups in a social networking system). For events related to the members of a private group, media content generated as part of the event can be shared within the group but not made available to other users of the content platform 340.

Some implementations of the services module 420 also output event data to various components of the telecommunications network to improve network resource allocation. For example, information about the location and approximate size of an event can be provided to network functions of a 5G network to modify network slicing or to balance uplink and downlink resources across the network in order to better support the volume of network traffic originating from the geographic area of the event. In another example, the services module 420 provides event data to one or more affected base stations to enable the base stations to optimize beamforming to support the network traffic associated with an event. The services module 420 can also predict a base station that is likely to handle increased uplink traffic in the future, based on past event data, and transmit data associated with such predictions to the RAN or core network components that are likely to be impacted in order for the components to allocate resources in advance of the event. The services module's predictions of increased uplink traffic at a base station can occur while an event is ongoing. For example, the services module 420 detects that a crowd of people is moving in a certain direction and thus are likely to move into a coverage area of a new NAN. Alternatively, the services module 420 detects that characteristics of the uplink network traffic indicate how the uplink traffic will continue to increase in a given NAN's coverage area. Accordingly, the services module 420 sends predicted traffic information to the affected NANs to enable the NANs to preemptively allocate resources. Predictions of increased uplink traffic can also occur before an event begins. For example, the services module 420 determines that a sporting event occurs in a given stadium every Saturday night, enabling the module 420 to notify affected network components to allocate resources for the increased uplink traffic that is expected during the sporting events.

Detecting Events

Figure 5:
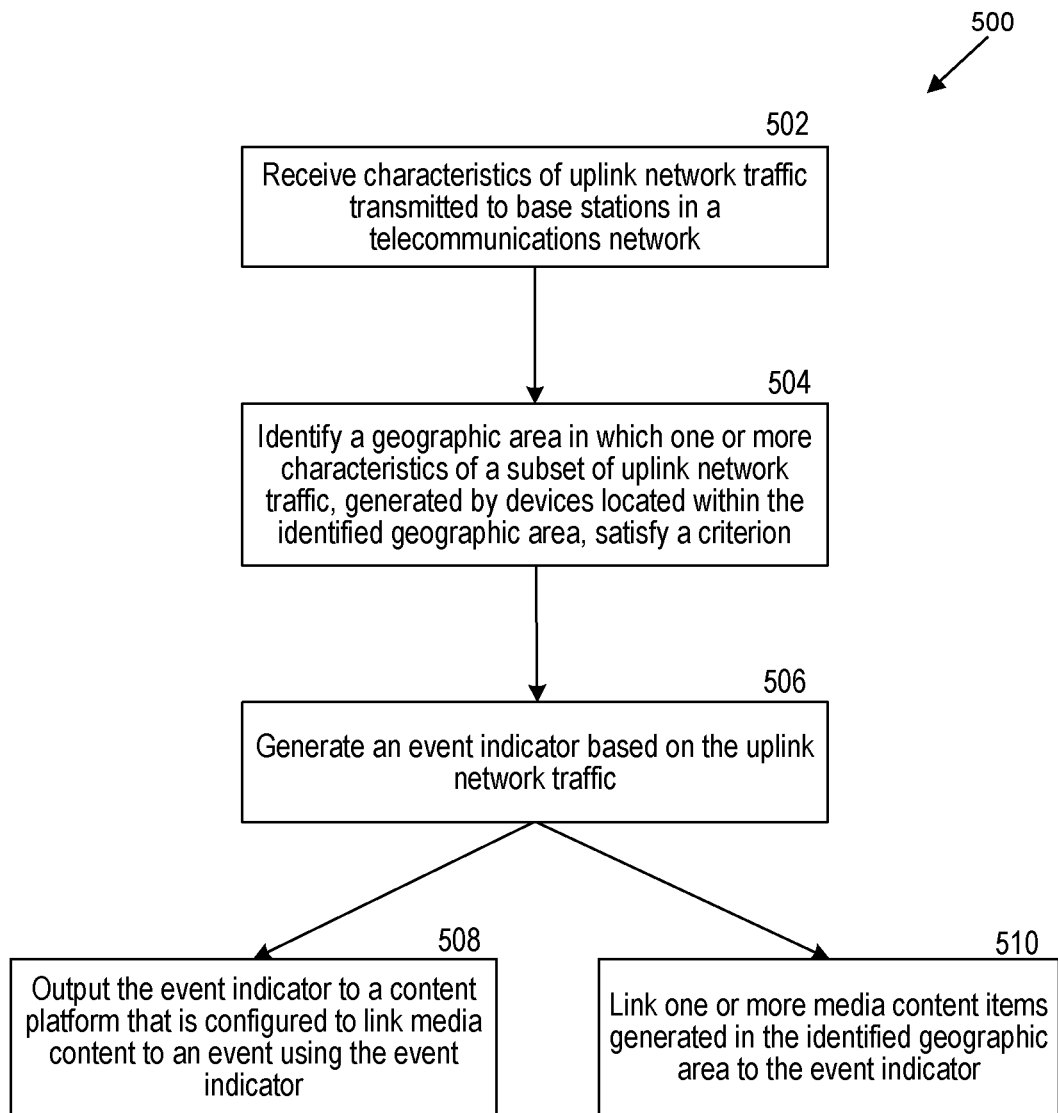
FIG. 5 is a flowchart illustrating a process for detecting events and generating event indicators, according to some implementations.

FIG. 5 is a flowchart illustrating a process 500 for detecting events and generating event indicators, according to some implementations. The process 500 can be performed by the event detection system 350. Other implementations of the process 500 can include additional, fewer, or different steps, or can perform the steps in different orders.

At 502, the event detection system 350 receives characteristics of uplink network traffic transmitted to one or more base stations in a telecommunications network. For example, the event detection system 350 receives information from the base stations at periodic intervals, which indicates volume of uplink traffic within the previous interval. Base stations can additionally or alternatively be configured to transmit information to the event detection system 350 when the uplink traffic passing through the base station meets or exceeds a specified threshold. The event detection system 350 can further receive or derive characteristics such as spatial density of electronic devices generating uplink traffic or a rate of increase of uplink traffic.

At 504, the event detection system 350 identifies a geographic area in which one or more characteristics of a subset of the uplink network traffic satisfy a criterion. Criteria applied by the event detection system 350 can include, for example, different criteria to detect different types of events, different criteria to detect events at different locations, or different criteria to detect events based on uplink traffic originating from different types of devices. In general, when the uplink network traffic in a geographic area satisfies a criterion, the event detection system 350 determines that an event is occurring in the area. In some implementations, the event detection system 350 only determines an event is occurring if it can identify a contiguous geographic area from which the uplink traffic satisfies the applicable criterion. For example, it may be more likely that an event is actually occurring when the system can identify a contiguous area, rather than the system erroneously aggregating multiple unrelated instances of uplink traffic. However, in other implementations, the event detection system 350 identifies an event occurring in a geographic area that is not contiguous if the uplink network traffic from the non-contiguous geographic area together satisfies an applicable criterion.

At 506, the event detection system 350 generates an event indicator based on the uplink network traffic. The event indicator is a data item or a data structure representing the detected event and defining the geographic area in which the event is occurring. The event indicator can further include starting and/or ending times of the event, one or more tags to describe or uniquely identify the event, or other data that may be requested by a system that partners with the event detection system 350 to provide event-based services.

Once the event indicator has been generated, the event detection system 350, other systems associated with the telecommunications network, and/or external third-party systems can use the event indicator to provide event-based services. Thus, in some implementations, the event detection system 350 outputs the event indicator, at 508, to a content platform via an application programming interface. The content platform can then build a service that leverages the event indicator to provide content or information to the platform's users. For example, the content platform links media content to an event using the event indicator. In other implementations, the event detection system 350 itself links, at 510, the event indicator to one or more media content items generated within the geographic area defined by the event indicator.

Emergency Response System

An example service offered by the event detection system 350 includes an emergency response service that leverages event data to provide useful information to emergency responders.

When a large group of people gather in an area, there is a chance that an emergency will occur within the crowd that warrants response by medical, fire, or law enforcement responders. In the chaotic environment of a large crowd, it can be difficult for first responders to determine the nature of the emergency, its location, and the nature of the crowd or events surrounding the emergency. However, some of the content captured by attendees at the event may help the responders understand how and where to respond effectively and safely.

Accordingly, the event detection system 350 can communicate with an emergency response system to output content items linked to an event to the emergency response system. As described above, some implementations of the event detection system 350 are associated with a telecommunications network, which can detect characteristics of uplink network traffic but does not have access to the underlying content items that are transmitted as part of the uplink traffic. Thus, the event detection system 350 can implement the emergency response service by partnering with one or more content platforms 340 to either receive content items from the content platforms or to cause the content platforms to output content items to emergency response systems. Alternatively, the event detection system 350 may receive content items directly from the users who captured the content items, for example by operating a content platform and/or asking users to upload content items to the event detection system 350 for emergency response. Under any of these implementations, the users who created the content items can be asked to approve use of their content items for emergency response purposes.

Figure 6:
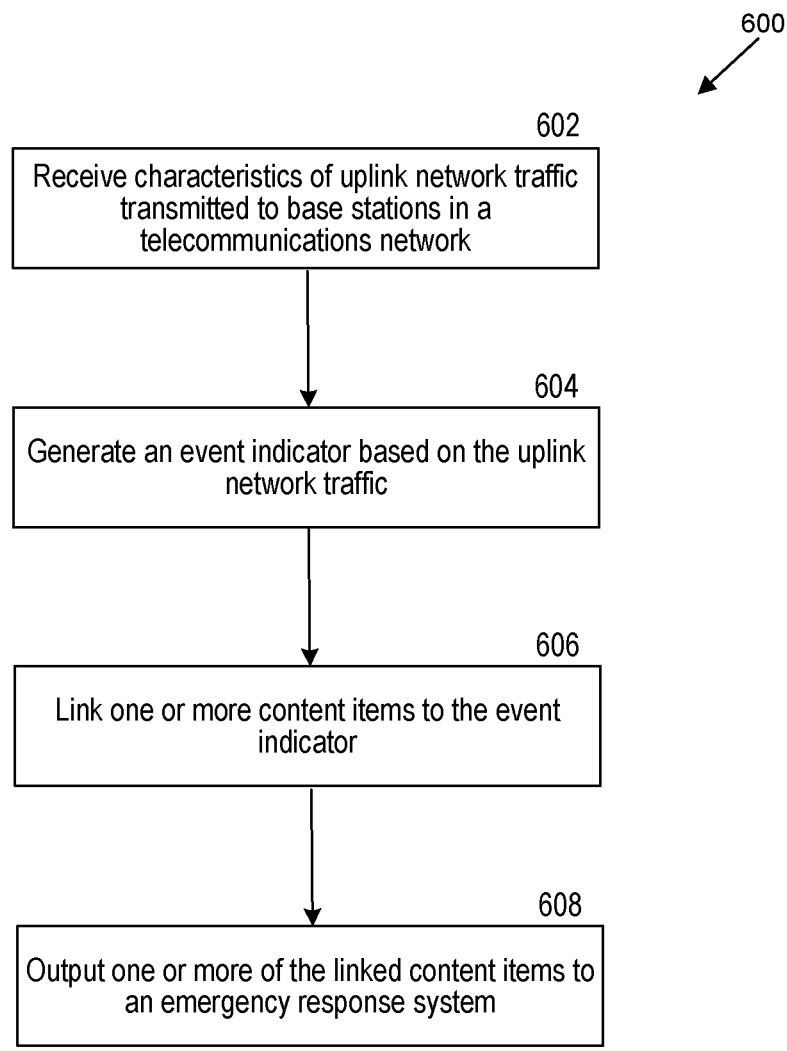
FIG. 6 is a flowchart illustrating an example process for leveraging crowd-sourced media content for emergency response, according to some implementations.

FIG. 6 is a flowchart illustrating an example process 600 for leveraging crowd-sourced media content for emergency response, according to some implementations. The process 600 is performed by a computer system. Aspects of the computer system that performs the process 600 can be similar to the event detection system 350 described with respect to FIG. 3. Alternatively, the computer system that performs the process 600 can receive information from the event detection system 350, such as event indicators. Other implementations of the process 600 can include additional, fewer, or different steps, or can perform the steps in different orders.

At 602, the computer system receives characteristics of uplink network traffic in a telecommunications network. At 604, the computer system generates an event indicator to represent an event detected based on the uplink network traffic. The computer system can generate the event indicator in a manner similar to that described with respect to FIGS. 3-5. For example, the computer system identifies a geographic area in which the characteristics of a subset of uplink network traffic, generated by electronic devices located within the identified geographic area, satisfy a criterion. The event indicator identifies that an event is occurring in an area and defines the geographic area in which it is occurring. In some cases, the event indicator further includes an identifier of the event, such as a human-readable or computer-readable tag to link content items to the event.

At 606, the computer system links one or more content items to the event indicator. In an example, a content item is linked to the event by adding a tag to the content item (e.g., in metadata associated with the content item) to uniquely identify the event. In another example, a content item is copied or moved into a data repository dedicated to the event. The computer system can link content items to an event automatically, for example when the content item is determined to have been captured within the geographic area of the event during the time the event is ongoing. Alternatively, users can be prompted to confirm whether their content item is part of an event when a user is capturing a content item within a threshold distance of the event's geographic area.

At 608, the computer system outputs one or more of the linked content items to an emergency response system. The emergency response system can include, for example, a mobile device carried by an emergency responder (such as a mobile telephone or a tablet device), or a system communicatively coupled to a device carried by an emergency responder. The computer system can output the linked content items to the emergency response system in response to requests received from the emergency response system. For example, a dispatch service queries the computer system for any content items linked to an event when first responders are being dispatched to the event. The computer system can alternatively send the emergency response system a notification when an event is detected, enabling a user of the emergency response system to request one or more content items if the user needs to respond to the event. Depending on the configuration of the emergency response system, the computer system can send the notification to any user devices within a threshold proximity to the event at the time the event is detected, a dispatch system that is responsible for the area in which the event is detected, or other designated devices selected by the first responders. The computer system can additionally send the notification to any emergency responder devices that move into a threshold proximity to the event while the event is ongoing.

In some implementations, the computer system outputs the linked content items by mapping the linked content items to different portions of the geographic area in which the event is occurring. For example, the computer system determines a location at which a content item was captured, using a GPS signal from the electronic device that captured the content item, triangulation by network access nodes, or other methods. Identifiers of the linked content items can then be displayed on an interactive map of the geographic area of the event in one example, enabling an emergency responder to select a content item from a region of interest. In another example, the computer system determines a direction from which the emergency responder is approaching an event and provides a linked content item that is mapped to a location closest to the responder's direction of approach. In still another example, the computer system identifies hotspots of activity, or regions within the geographic area of the event that have more activity than other regions (as indicated by uplink network traffic originating from the region of the hotspot). For example, the computer system identifies a subregion within the geographic area of the event from which at least a threshold percentage of the event's uplink network traffic originated, then labels the identified subregion as being a "hotspot." Once such a hotspot has been identified, the computer system can output a content item originating from within the hotspot to the emergency response system and/or direct the emergency responder to the hotspot.

Computer System

Figure 7:
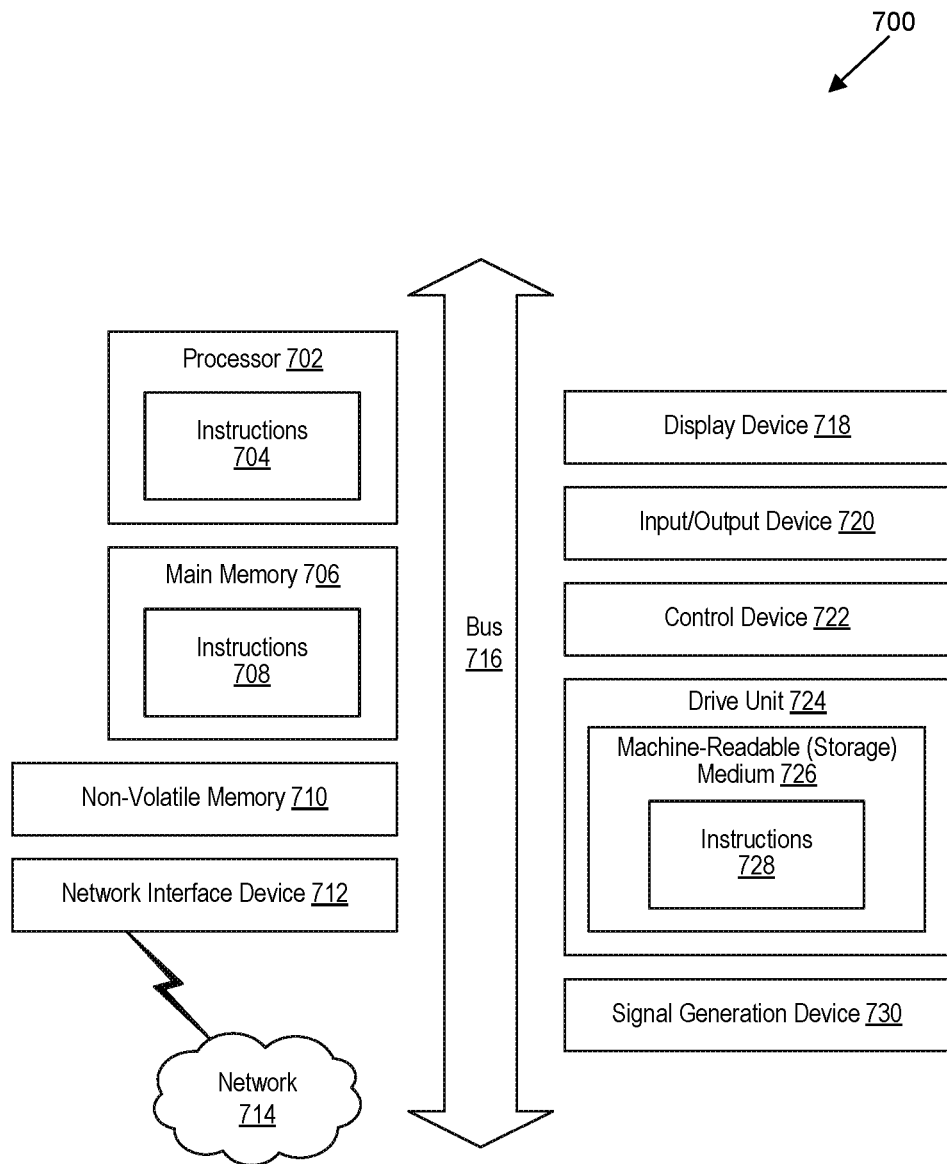
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, video display device 718, an input/output device 720, a control device 722 (e.g., keyboard and pointing device), a drive unit 724 that includes a storage medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the FIGURES and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementation, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

REMARKS

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

We claim:

1. A system communicatively coupled to a plurality of base stations in a telecommunications network, the system comprising:

at least one hardware processor;

at least one non-transitory memory, coupled to the at least one hardware processor and storing instructions, which when executed by the at least one hardware processor, perform a process, the process comprising:
receiving, from one or more of the plurality of base stations, one or more characteristics of uplink network traffic transmitted to the one or more base stations by electronic devices that are registered to communicate on the telecommunications network;
identifying a contiguous geographic area in which the one or more characteristics of a subset of uplink network traffic, generated by electronic devices located within the identified geographic area, satisfy a criterion,
wherein satisfaction of the criterion indicates an event is occurring in the identified geographic area, and
wherein the criterion comprises a first criterion applied to uplink network traffic originating from a first type of electronic device and a second criterion applied to uplink network traffic originating from a second type of electronic device;
generating an event indicator based on the identified geographic area and the subset of uplink network traffic; and
outputting the event indicator, via an application programming interface, to a content platform,
wherein the content platform is configured to link media content associated with the content platform to the event using the event indicator.

2. The system of claim 1, wherein the one or more characteristics of the uplink traffic comprises a volume of uplink network traffic, a spatial density of electronic devices generating uplink network traffic, or a rate of increase of uplink network traffic.

3. The system of claim 1, wherein the process further comprises detecting a first type of event when the one or more characteristics of the subset of uplink network traffic satisfy a first criterion and detecting a second type of event when the one or more characteristics of the subset of uplink network traffic satisfy a second criterion.

4. The system of claim 1, wherein the process further comprises:
detecting that a first event is occurring in a first geographic area when the one or more characteristics of a first subset of uplink network traffic generated within the first geographic area satisfy a first criterion; and
detecting that a second event is occurring in a second geographic area when the one or more characteristics of a second subset of uplink network traffic generated within the second geographic area satisfy a second criterion that is different from the first criterion.

5. The system of claim 1, wherein the process further comprises:
generating a tag including a user-readable or computer-readable identifier of the event; and
outputting the tag to the content platform, wherein the content platform is configured to link the media content associated with the content platform to the event using the tag.

6. The system of claim 5, wherein the process further comprises:
predicting an identity of the event; and
generating the tag based on the predicted identity of the event.

7. The system of claim 5, wherein the process further comprises:
receiving user input describing the event; and
generating the tag based on the received user input.

8. The system of claim 1, wherein the process further comprises identifying the identified geographic area based on relative positions of the one or more base stations to the electronic devices located within the identified geographic area.

9. The system of claim 1, wherein generating the event indicator comprises:
determining at least a subset of the electronic devices located within the identified geographic area are located inside a venue;
generating a geographic area identifier that identifies the venue as a location for the event; and
storing the geographic area identifier in the event indicator.

10. The system of claim 1, wherein generating the event indicator comprises:
selecting latitudinal and longitudinal coordinates that define a boundary around the identified geographic area; and
storing the latitudinal and longitudinal coordinates in the event indicator.

11. A non-transitory computer-readable storage medium storing executable instructions, the instructions when executed by one or more processors causing the one or more processors to:
receive, from a plurality of base stations in a telecommunications network, one or more characteristics of uplink network traffic transmitted to the base stations by electronic devices;
identify a contiguous geographic area in which the one or more characteristics of a subset of uplink network traffic, generated by electronic devices located within the identified geographic area, satisfy a criterion,
wherein the criterion comprises a first criterion applied to uplink network traffic originating from a first type of electronic device and a second criterion applied to uplink network traffic originating from a second type of electronic device;
generate an event indicator based on the identified geographic area and the subset of uplink network traffic; and
output the event indicator, via an application programming interface, to a content platform, wherein the content platform is configured to link media content associated with the content platform to an event using the event indicator.

12. The non-transitory computer-readable storage medium of claim 11, wherein execution of the instructions further causes the one or more processors to:
detect a first type of event when the one or more characteristics of the subset of uplink network traffic satisfy a first criterion; and
detect a second type of event when the one or more characteristics of the subset of uplink network traffic satisfy a second criterion.

13. The non-transitory computer-readable storage medium of claim 11, wherein execution of the instructions further causes the one or more processors to:
detect that a first event is occurring in a first geographic area when the one or more characteristics of a first subset of uplink network traffic generated within the first geographic area satisfy a first criterion; and
detect that a second event is occurring in a second geographic area when the one or more characteristics of a second subset of uplink network traffic generated within the second geographic area satisfy a second criterion that is different from the first criterion.

14. The non-transitory computer-readable storage medium of claim 11, wherein execution of the instructions further causes the one or more processors to:
   generate a tag including a user-readable or computer-readable identifier of the event; and
   output the tag to the content platform, wherein the content platform is configured to link the media content associated with the content platform to the event using the tag.

15. The non-transitory computer-readable storage medium of claim 14, wherein execution of the instructions further causes the one or more processors to:
   predict an identity of the event based on the characteristics of the uplink network traffic; and
   generate the tag based on the predicted identity of the event.

16. The non-transitory computer-readable storage medium of claim 11, wherein generating the event indicator comprises:
   determining at least a subset of the electronic devices located within the identified geographic area are located inside a venue;
   generating a geographic area identifier that identifies the venue as a location for the event; and
   storing the geographic area identifier in the event indicator.

17. A non-transitory computer-readable storage medium storing executable instructions, the instructions when executed by one or more processors causing the one or more processors to:
   receive, from a plurality of base stations in a telecommunications network, one or more characteristics of uplink network traffic transmitted to the base stations by electronic devices;
   identify a contiguous geographic area in which the one or more characteristics of a subset of uplink network traffic, generated by electronic devices located within the identified geographic area, satisfy a criterion,
      wherein the criterion comprises a first criterion applied to uplink network traffic originating from a first type of electronic device and a second criterion applied to uplink network traffic originating from a second type of electronic device;
   generate an indicator data structure that represents the identified geographic area based on the subset of uplink network traffic; and
   link one or more media content items generated inside the identified geographic area to the indicator data structure.

18. The non-transitory computer-readable storage medium of claim 17, wherein generating the indicator data structure comprises:
   selecting latitudinal and longitudinal coordinates that define a boundary around the identified geographic area; and
   storing the latitudinal and longitudinal coordinates in the indicator data structure.

* * * * *